United States Patent [19]

Takeda

[11] Patent Number: 4,695,741
[45] Date of Patent: Sep. 22, 1987

[54] SWITCHGEAR

[75] Inventor: Masatoshi Takeda, Hyogo, Japan

[73] Assignee: Mitsubishi Denki Kabushiki Kaisha, Tokyo, Japan

[21] Appl. No.: 732,720

[22] Filed: May 10, 1985

[30] Foreign Application Priority Data

May 11, 1984 [JP] Japan .................................. 59-92914
May 14, 1984 [JP] Japan .................................. 59-94493

[51] Int. Cl.$^4$ ........................................... H03K 17/72
[52] U.S. Cl. ..................... 307/643; 307/12; 307/38; 307/131; 307/646
[58] Field of Search ....... 307/252 UA, 252 N, 252 M, 307/252 Q, 252 T, 542, 549, 246, 12, 30, 38, 103, 108, 131, 75, 85

[56] References Cited

U.S. PATENT DOCUMENTS 3,651,375  3/1972  Ebersohl .................. 307/252 N
4,319,318  3/1982  Rippel et al. ............. 307/252 M
4,571,499  2/1986  Wein ........................ 307/252 P

OTHER PUBLICATIONS

ASEA Pamphlet YT 38-101 E, Power-Factor Correction with Thyristor-Controlled Capacitors, Harry Frank et al.

Primary Examiner—John Zazworsky
Attorney, Agent, or Firm—Bernard, Rothwell & Brown

[57] ABSTRACT

A switchgear operable to conduct or shut off the a.c. current to an a.c. load by use of a semiconductor switch. The switchgear is formed such that a common thyristor switch in serial connection with a switch is connected in parallel to a switch for each of capacitor banks, so that each capacitor bank is connected or disconnected to the a.c. power line in non-contact manner through the thyristor switch.

3 Claims, 35 Drawing Figures

FIG. 4A
POWER
VOLTAGE

FIG. 4B
THYRISTOR
SWITCH
VOLTAGE

FIG. 4C
CAPACITOR
CURRENT

SWITCHGEAR

BACKGROUND OF THE INVENTION

The present invention relates to a switchgear and particularly to a switchgear operable to connect or disconnect a load circuit to an a.c. power source by use of a semiconductor switching device.

There have been proposed various switchgears of this type. One typical example of conventional capacitor switchgears operating to open or close a capacitor load circuit is formed of a thyristor switch made up of anti-parallel connected thyristors and connected between the capacitor load and the a.c. power source, and a control circuit for the thyristor switch, as disclosed for example in Japanese Patent Publication No. 34430/73. In connecting the capacitor load to the a.c. power source, the control circuit operates on the thyristor switch to turn on at a time point when the terminal voltage of the thyristor switch has become zero, so that the rush current to the capacitor is reduced. For turning off the thyristor switch, the gate firing signal to the thyristor is removed, and the thyristor switch turns off when the capacitor current reaches almost zero. However, this time point is coincident with the peak phase of the power voltage, leaving the capacitor charged to the peak power voltage. On this account, in the first cycle of power voltage following the turn-off operation, the thyristor switch is applied with this capacitor voltage plus the peak power voltage, i.e. a doubled peak power voltage. Therefore, thyristor devices used for this purpose are required to have a breakdown voltage at least twice the peak power voltage.

One method for reducing the voltage across the thyristor switch is to connect a nonlinear resistor in parallel to the thyristor switch. In this case, the nonlinear resistor needs to be selected to have a threshold characteristic approximately 2-3 times higher than the normal voltage across the tyristor switch in the off-state, or the power dissipation of the nonlinear resistor will be too large for the practical use. Accordingly, even though this voltage suppression method is employed, thyristor devices need to have a breakdown voltage two or three times the peak power voltage.

As will be appreciated from the above description, the thyristor switch used in the conventional capacitor switchgear needs to have a breakdown voltage at least twice the peak power voltage, and in consideration of the external surge voltage, thyristor devices withstanding at least three times as high as the peak power voltage must be used. This causes an increase in the number of thyristor devices in serial connection, resulting disadvantageously in a higher construction cost and also a larger power loss during the conductive period of the thyristor switch.

Such a capacitor switchgear is used for controlling the reactive power on an a.c. power line, as disclosed for example in Japanese magazine "Electric Calculation", FIG. 11, p. 258, Oct., 1969. In this case, the thyristor switch stays on while the capacitor load is connected to the power line, creating a larger power loss due to a forward voltage drop in the thyristor, that results in a low power efficiency and the need of a large and expensive cooling system. In such applications, each capacitor bank needs an individual thyristor switch, and therefore the construction cost is high and the power loss due to a forward voltage drop in the thyristor is large.

Figure 1:
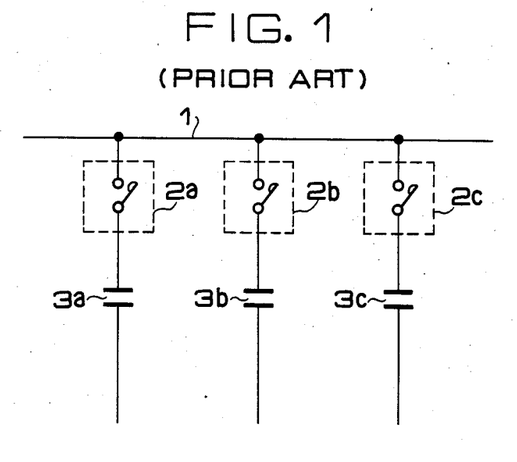
FIG. 1 is a schematic diagram of the conventional capacitor switchgear for controlling reactive power using mechanical switches.

FIG. 1 is a schematic diagram of the conventional capacitor switchgear for controlling reactive power using mechanical switches.

In the figure, reference number 1 denotes an a.c. power line, 2a-2c are switches, and 3a-3c are a.c. load capacitors connected to the a.c. power line 1 through the switches 2a-2c, respectively.

Next, the operation of the above arrangement will be described. In FIG. 1, when the power-factor of the a.c. power line 1 becomes lower, the switches 2a-2c are turned on sequentially so that the capacitors 3a-3c are connected to line in accordance with the value of power-factor. In this case, a rush current 6-10 times the rates current will flow in a certain phase relationship of throwing the switches 2a-2c, resulting in a significant distortion in the a.c. power line voltage, which adversely affects other facilities (e.g., thyristor converter) connected on the same power line. On this account, the capacitors cannot have a large unit bank capacitance, and an increased number of capacitor banks are needed. This results disadvantageously in a larger installation space and a higher construction cost. In addition, when the switches are operated continually, the transient phenomena at connecting or disconnecting the capacitors impair the work life of the switches 2a-2c and capacitors 3a-3c.

Figure 2:
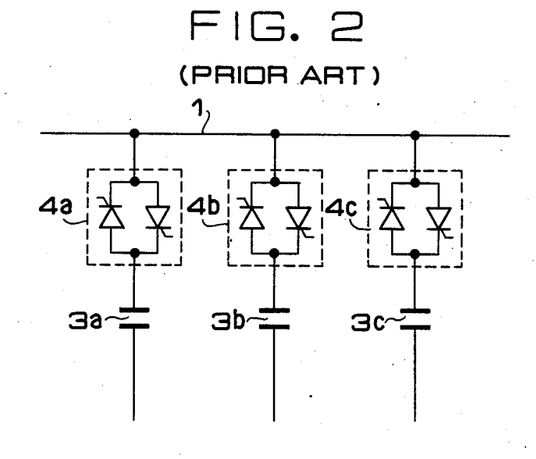
FIG. 2 is a schematic diagram of the conventional capacitor switchgear made up of a thyristor switch for every capacitor bank.

To cope with these problems in the use of frequent switching operation, a capacitor switchgear is designed to connect or disconnect capacitors 3a-3c with thyristor switches 4a-4c, each made up of anti-parallel-connected thyristors as shown in FIG. 2, in place of the switches 3a-3c in FIG. 1, as disclosed for example in Japanese Patent Publication No. 40218/75.

Figure 3:
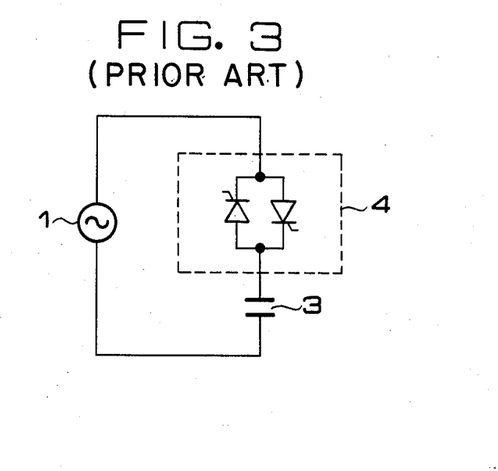
FIG. 3 shows a basic circuit arrangement for connecting a capacitor to an a.c. power source by means of the thyristor switch in FIG. 2.

FIG. 3 shows a basic circuit arrangement for connecting or disconnecting a capacitor 3 to an a.c. power source 1 by means of the thyristor switch 4 shown in FIG. 2.

Figure 4A:
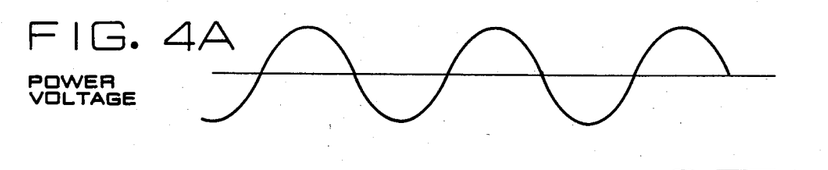
FIGS. 4A-4C are waveform diagrams of the circuit of FIG. 3.

Next, the operation of the above basic circuit arrangement will be described in connection with the waveform diagrams of FIGS. 4A, 4B and 4C. The thyristor switch 4 is off up to a time point $t_1$, shown in FIGS. 4A and 4B and a voltage E equal to the a.c. peak power voltage shown in FIG. 4A is applied across the thyristor switch 4 as shown in FIG. 4B.

When the load capacitor 3 is to be connected to the power source, the thyristor switch 4 is controlled by a control signal provided by a control circuit (not shown) so that it is turned on in response to a zero voltage across it. Namely, the thyristor switch 4 is turned on at the time point $t_1$ in FIGS. 4B and 4C. Then, a current shown in FIG. 4C flows through the capacitor.

Figure 4B:
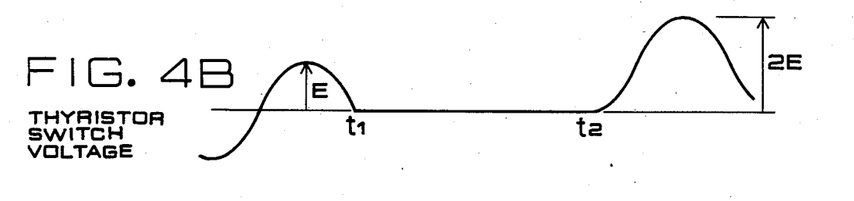
Figure 4C:
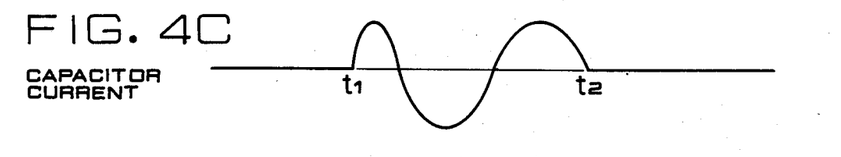

To turn off the thyristor switch 4, the firing signal to the gate of the thyristors is removed, and the thyristor switch 4 becomes nonconductive at a time point $t_2$ when the capacitor current has fallen to zero as shown in FIG. 4C. The time point $t_2$ is coincident with the peak phase of the power voltage E, and the capacitor 3 is charged to the peak power voltage E at the time point $t_2$.

Accordingly, when the thyristor switch 4 becomes off at $t_2$, the capacitor 3 is left charged to the voltage E, which is added to the voltage of the a.c. power source 1, resulting in the application of a 2E voltage across the thyristor switch 4 following the time poiint $t_2$ as shown in FIG. 4B. On this account, the thyristor devices used need to have a withstand voltage of at least 2E-3E.

During the period when the capacitor 3 is connected to the power source, the thyristor switch 4 stays on, creating a significant power loss due to the forward voltage drop of the thyristors, resulting in a lower power efficiency and the need of a large cooling system that makes the switchgear expensive.

The conventional capacitor switchgears are arranged as described above, and in the case of using a mechanical switch shown in FIG. 1, it cannot be used for a frequent switching operation and the capacitor bank cannot have a large unit capacitance due to the creation of a power voltage distortion by the rush current when the capacitors are connected. In another case of using a thyristor switch shown in FIG. 2, the forward voltage drop of each thyristor creates a large power loss and a thyristor switch is needed for each capacitor bank, resulting in a higher construction cost.

SUMMARY OF THE INVENTION

A main object of this invention is to provide a switchgear which is less expensive as compared with conventional ones through the use of semiconductor switching devices with a lower breakdown voltage.

Another object of the invention is to provide a switchgear using a semiconductor switch with extremely small electrical loss during the conductive period.

Still another object of the invention is to provide a compact, inexpensive large-power switchgear which does not need an accompanying device such as a cooler.

A further object of the invention is to provide an improved switchgear which does not impair the work life of capacitors and switching devices even under a continual switching operation.

DESCRIPTION OF THE PREFERRED EMBODIMENTS

Figure 5:
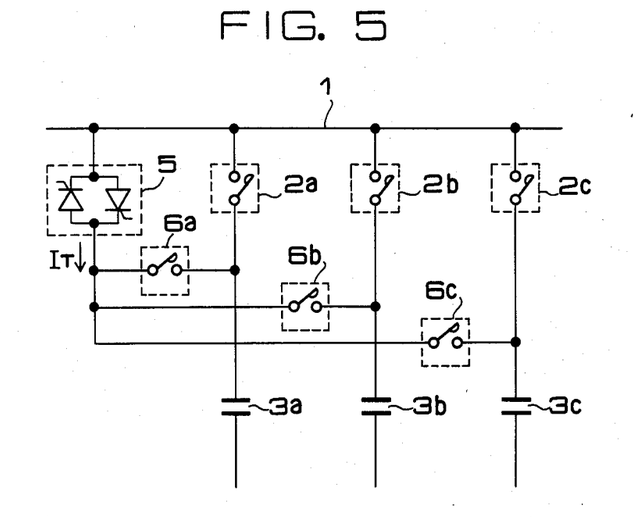
FIG. 5 is a schematic diagram showing a first embodiment of a switchgear according to this invention.

FIG. 5 is a circuit diagram of the switchgear according to a first embodiment of this invention wherein the portions corresponding to the circuit of FIG. 1 are shown by the same reference numerals. In FIG. 5, reference numeral 5 illustrates a thyristor switch commonly used for a plurality of capacitor banks $3a$-$3c$, and $6a$-$6c$ depict switches for the thyristor switch, inserted between the load terminal of the thyristor switch 5 and power supply terminals of capacitors $3a$-$3c$.

Figure 6:
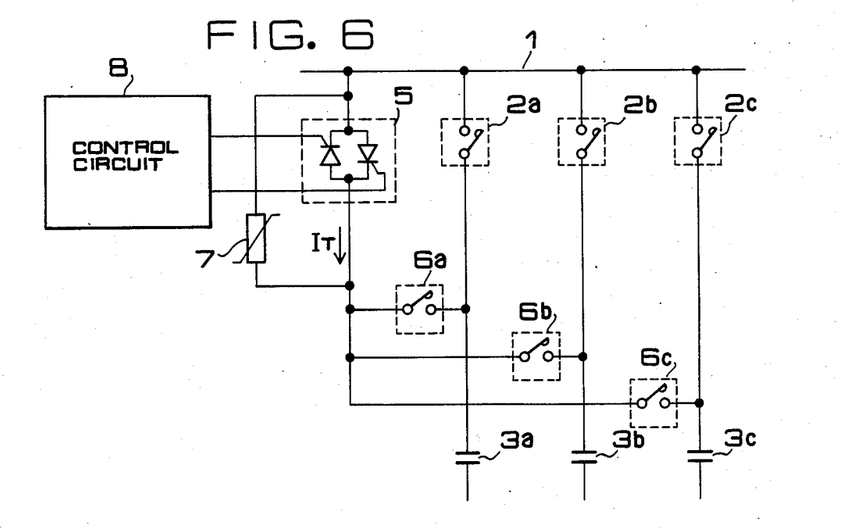
FIG. 6 is a schematic diagram showing the second embodiment of this invention.
Figures 7A, 7B:
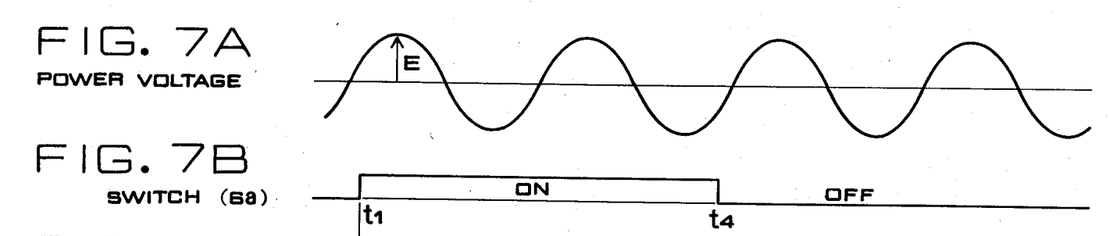
FIGS. 7A-7F are waveform diagrams showing an operation of the circuit of FIG. 5 when the capacitor is connected to the power line.
Figure 7C:
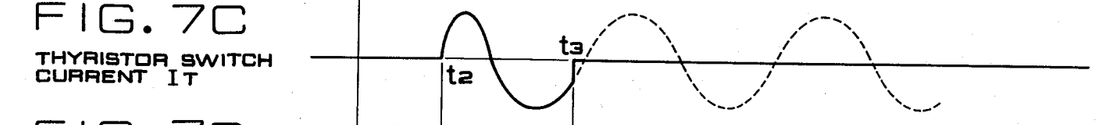
Figures 7D, 7E:
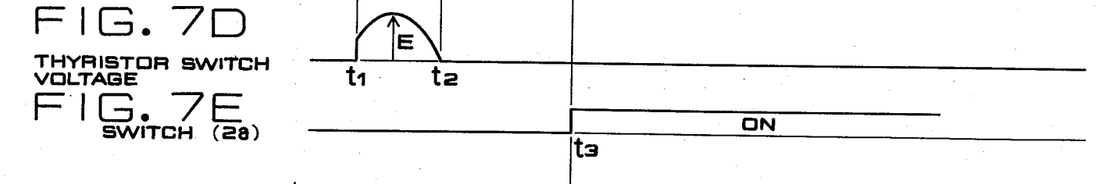
Figure 7F:
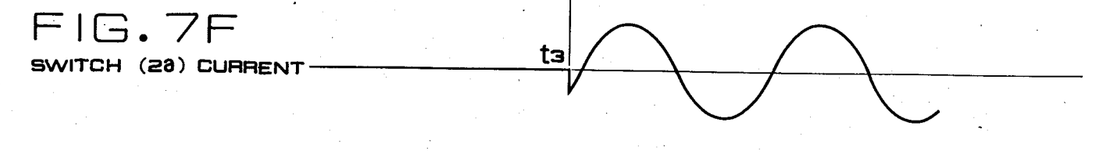

The operation of the above arrangement will be described with reference to FIGS. 7A-7B. Initially, the mechanical switches $2a$-$2c$ and $6a$-$6c$ and the thyristor switch 5 are all in the off-state, and the capacitor banks $3a$-$3c$ are disconnected from the power line 1. For connecting the capacitor bank $3a$ to the a.c. power line 1, the switch $6a$ is turned on at an arbitrary time point $t_1$ as shown in FIG. 7B, while leaving the thyristor switch 5 in nonconductive state as shown in FIG. 7C. Consequently, the thyristor switch 5 is applied with a voltage equal to the peak power voltage E, as shown in FIG. 7D, and at the time point $t_2$ when the voltage across the thyristor switch 5 has become zero, the control circuit 8, shown in FIG. 6, provides a gate signal to turn on the thyristor switch 5. Then, the capacitor bank $3a$ is connected to the a.c. power line 1 without the creation of a rush current. The thyristor switch 5 thereafter conducts a current $I_T$ as shown in FIG. 7C. After the capacitor bank $3a$ has been connected to the power line, the switch $2a$ is turned on at a time point $t_3$ as shown in FIG. 7E, so that the current flowing through the thyristor switch 5 is taken by the switch $2a$ as shown in FIG. 7F. Then, the thyristor switch 5 is turned off and, thereafter, the switch $6a$ is turned off at a time point $t_4$.

Next, for connecting the capacitor bank $3b$, the switch $6b$ is turned on with the thyristor switch 5 being kept off, as in the previous case of connecting the capacitor bank $3a$, and the thyristor switch 5 is turned on when the voltage across it has become zero. The capacitor bank $3b$ is thus connected to the power line 1 without the creation of a rush current. Subsequently, the switch $2b$ is turned on so that the current flowing through the thyristor switch 5 is shunted by the switch $2b$. Then, the thyristor switch 5 is turned off and, thereafter, the switch $6b$ is turned off.

The thyristor $3c$ can be connected to the power line through the use of the thyristor switch 5 in the same procedure as described above.

The thyristor switch 5 operates to connect capacitor loads $3a$-$3c$ to the power line, so that the creation of a rush current in the circuit is prevented, and the thyristor switch can have a short-time rating and causes less power loss, since the load current is taken by the switches $2a$-$2c$ immediately after the corresponding capacitor has been connected to the power line 1.

Figures 8A, 8B:
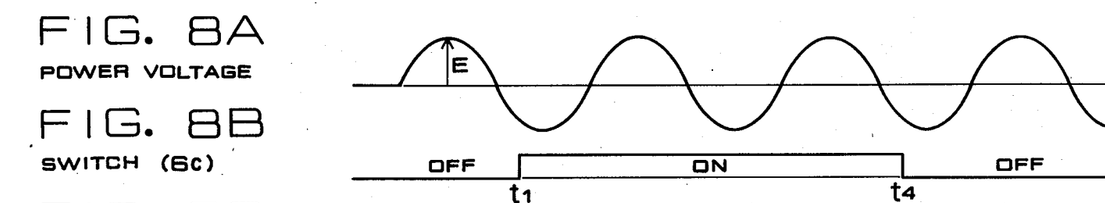
FIGS. 8A-8F are waveform diagrams showing an operation of the circuit of FIG. 5 when the capacitor is disconnected from the power line.
Figures 8C, 8D, 8E:
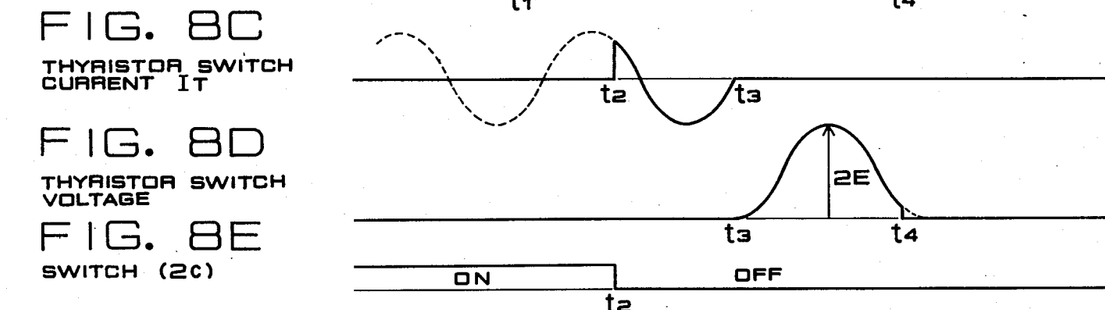
Figure 8F:
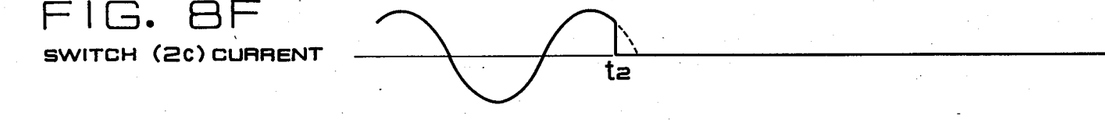

Next, the operation for disconnecting the capacitor bank $3c$ will be described. In FIG. 8B, the switch $6c$ is turned on at a time point $t_1$, and the thyristor switch 5 is also turned on at the same time. Thereafter, the switch $2c$ is turned off at $t_2$ as shown in FIG. 8E so that the current flowing through the switch $2c$ is shunted to the thyristor switch 5 as shown in FIGS. 8C and 8F. After the gate signal to the thyristor switch 5 is removed, the thyristor switch 5 is turned off at a time point $t_3$ when the current flowing through it falls to zero as shown in FIG. 8C, and the current in the circuit is shut off. At this time, the capacitor 3c is charged to the peak power voltage E, causing the thyristor switch 5 to be applied with a voltage of 2E. Therafter, the switch 6c is turned off at a time point t4, and the capacitor bank 3c is completely disconnected from the a.c. power line 1.

The capacitor bank 6b is disconnected from the power line in the same way as of the capacitor bank 6c, and initially the switch 6b and the thyristor switch 5 are turned on at the same time. Thereafter, the switch 2b is turned off so that the current flowing through the switch 2b is shunted to the thyristor switch 5. After the gate signal to the thyristor switch 5 is removed, it is turned off when the current flowing in it falls to zero, and the current in the circuit is shut off. Thereafter, the switch 6b is turned off, and the capacitor bank 3b is completely disconnected from the a.c. power line 1.

The same operations take place when the capacitor bank 3a is disconnected from the a.c. power line 1.

As described above, when connecting or disconnecting the capacitor banks 3a–3c to the power line, the operation takes place in a noncontact fashion by the use of the thyristor switch 5 so as to prevent the occurrence of transient phenomena such as a rush current, whereby a voltage distortion is not created on the a.c. power line 1 when each capacitor is connected to the power line. Because of the absence of a rush current to the capacitor at the connecting operation, its work life is not impaired. Moreover, the switches 2a–2c and 6a–6c are turned on or off when no current flows in them or the current is bypassed by other circuit, whereby the work life of the switches is not impaired. These switches are not required to have a large current switching capacity, and common circuit breakers can be used for this purpose.

FIG. 6 is a schematic diagram showing the second embodiment of this invention, in which components identical to those of FIG. 5 are referred to by the common symbols. The arrangement of FIG. 6 includes a nonlinear resistor 7 connected in parallel to the thyristor switch 5.

Figures 9A, 9B:
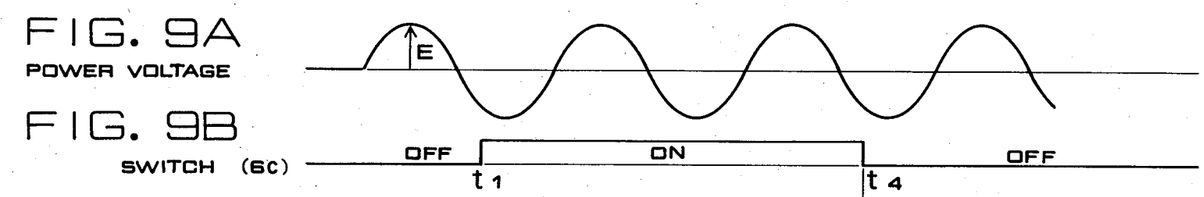
FIGS. 9A-9F are waveform diagrams showing an operation of the circuit of FIG. 6 when the capacitor is disconnected from the power line.
Figures 9C, 9D, 9E:
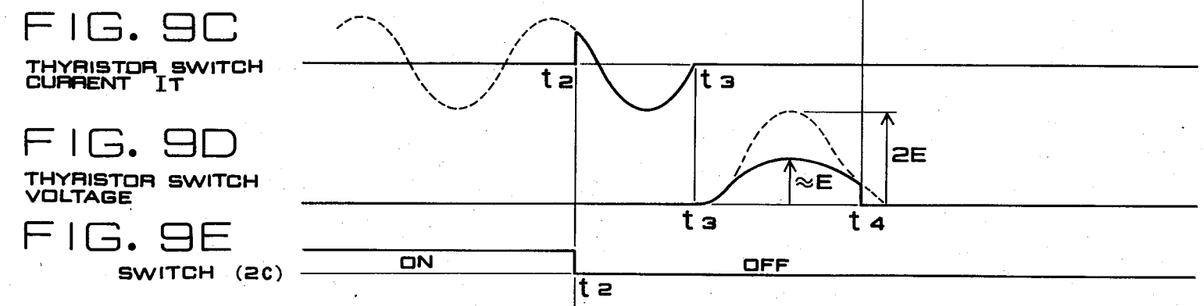
Figure 9F:
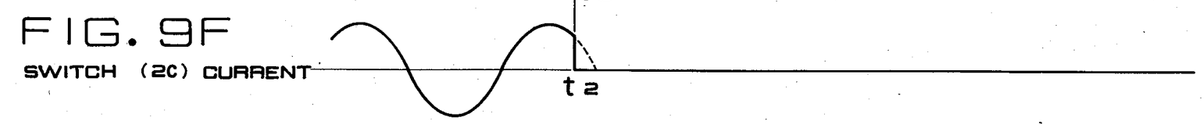

The connecting operation for the capacitor banks 3a–3c in this embodiment is completely identical to the case of FIG. 5. In disconnecting the capacitors 3a–3c from the power line in the embodiment of FIG. 5, the capacitors 3a–3c are charged to the peak power voltage E immediately after the thyristor switch 5 has been turned off at time point t3 as shown in FIG. 8C, causing the thyristor switch 5 to be applied to a voltage of 2E as shown in FIG. 8D, and the thyristor switch 5 needs to have a withstand voltage of at least 2E, as mentioned previously. However, in the embodiment of FIG. 6 the nonlinear resistor 7 connected parallel to the thyristor switch 5 causes voltage across the turned-off thyristor switch 5 to fall to a level substantially equal to the peak power voltage E, as shown by the solid curve in FIG. 9D.

The nonlinear resistor 7 is supplied with the voltage only during a short period when the thyristor switch 5 is turned on or off, resulting in a small power dissipation by the resistor. On this account, it is possible to suppress the voltage applied across the thyristor switch 5 to a level substantially equal to the voltage E during the short transitional period.

Accordingly, through the connection of the nonlinear resistor 7 in parallel to the thyristor switch 5, the voltage across the thyristor switch 5 can be limited, whereby inexpensive switchgear can be realized.

Figure 10:
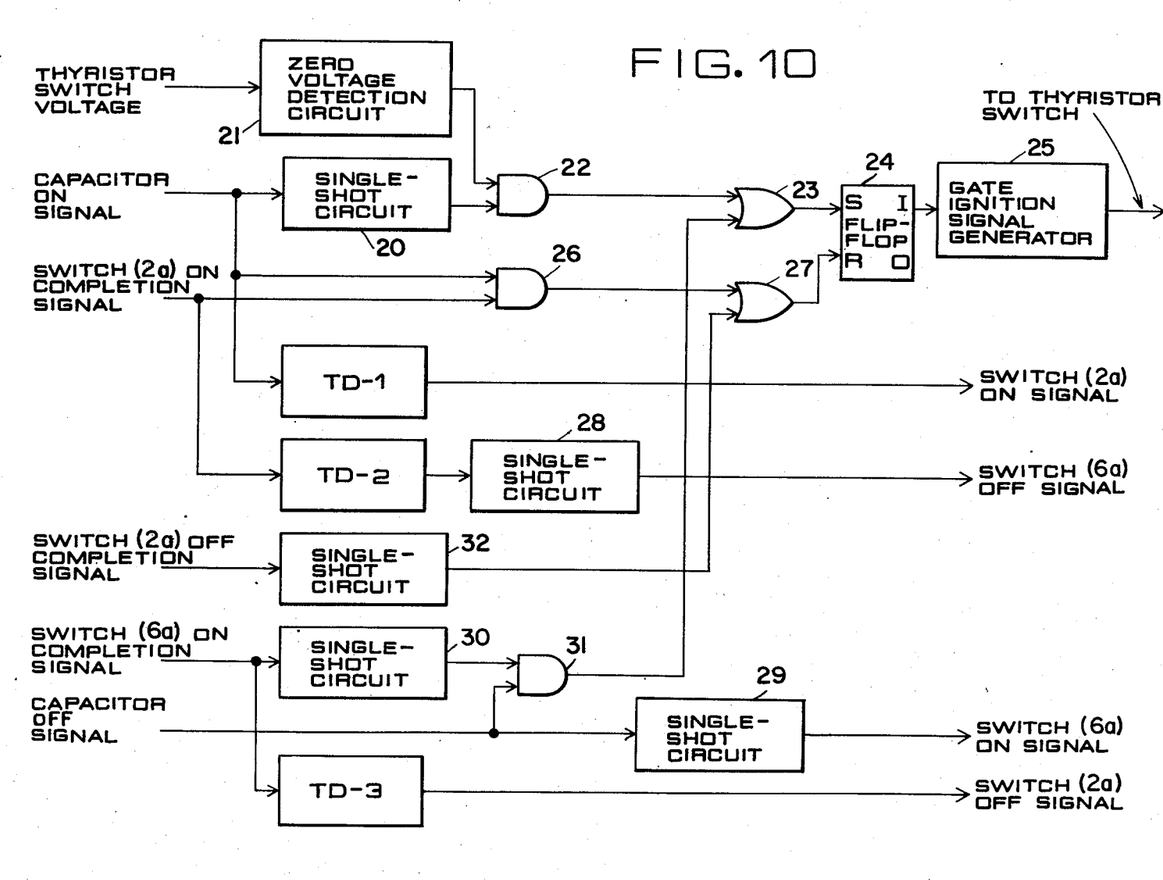
FIG. 10 is a detailed circuit diagram of the control circuit 8 in FIG. 6.

FIG. 10 is a detailed diagram of a control circuit 8 as one example used in the above embodiment.

The following sequential operation is performed by the circuit of FIG. 10 when a capacitor is connected to the power line. First, assume that the capacitor 3a is to be connected to the power line, that the switch 2a is turned off, and that the switch 6a is turned on. When the capacitor-ON-signal is inputted, then the single-shot circuit 20 is driven and outputs an "H"-signal for a predetermined period of time. The voltage across the thyristor switch is applied to the zero voltage detection circuit 21. The detection circuit 21 delivers a pulse signal when the above-described voltage across the thyristor switch becomes zero. Both the output signals of the detection circuit 21 and single-shot circuit 20 are inputted to the AND gate 22. An "H"-signal is delivered from AND gate 22 to the OR gate 23 when both the input signals to the AND gate are "H"-signals. Accordingly, an "H"-signal is sent via the OR gate to the flip-flop circuit 24, thereby actuating the flip-flop circuit 24 to be set. As a result, an output of the output terminal "I" of the flip-flop circuit 24 becomes an "H"-signal and supplied to the gate ignition signal generator 25 to enable it to be operated. Then, the gate ignition signal is supplied to the thyristor switch 5, thereby turning on the thyristor switch 5.

Since the voltage across the thyristor switch 5 always becomes zero when the thyristor switch 5 is turned on by controlling the gate ignition signal of the thyristor switch 5, substantially no rush current flows through the capacitor 3a when the thyristor switch 5 is turned on. As a result, the capacitor can be connected to the power line without occurrence of transient phenomena.

When the capacitor-ON signal is inputted to the control circuit 8, it is also supplied to the time delay circuit TD-1. Then, this time delay circuit TD-1 delivers the switch-ON signal to the switch 2a after a predetermined delay time. The delay time is selected to be longer than a period of time during which the thyristor switch 5 is completely turned on after the capacitor-ON signal is inputted thereto.

When the switch-ON signal for the switch 2a is produced from the time delay circuit TD-1, the switch 2a is turned on and the thyristor switch 5 is bypassed by the switch 2a. Furthermore, when the switch 2a is turned on, the switch-ON completion signal is delivered to the AND circuit 26, so that an output of the AND circuit 26 becomes "High" and thus, an "H"-signal is supplied via the OR circuit 27 to the reset terminal of the flip-flop circuit 24, thereby resetting the flip-flop circuit. Accordingly, the output of the output terminal "I" of the flip-flop circuit 27 becomes "Low", so that the gate ignition signal generator 25 is deenergized, the supply of the gate ignition signal to the thyristor switch 5 is interrupted and the thyristor switch 5 is turned off. The switch-ON completion signal is inputted to the time delay circuit TD-2, and subsequently the single-shot circuit 28 is energized after a given delay time, thereby delivering the switch-OFF signal to the switch 6a. Then, the switch 6a is turned off, and the capacitor current flows through the switch 2a. Subsequently, when the capacitor 3b is connected to the power line, the following sequential operation as same as the above-described sequential operation will be performed. First, after the switch 6b is turned on, the thyristor 5 is turned on. Secondly, the thyristor switch 5 is turned off and the switch 6b is turned off after the switch 2b is turned on.

As a result, the capacitors 3a to 3c can be successively connected to the power line without occurrence of transient phenomena by the commonly-used thyristor switch 5 under the above-defined sequential operation.

The following sequential operation is performed by the circuit of FIG. 10 when the capacitors are disconnected from the power line. First, assuming that the capacitor 3a is to be disconnected from the power line, the single-shot circuit 29 is energized upon receipt of the capacitor-OFF signal and the switch 6a receives the switch-ON signal, thereby turning on the switch 6a. Upon completion of the turn-on operation of the switch 6a, the switch-ON completion signal is outputted from the switch 6a and thereafter inputted to the single-shot circuit 30. When the output of the single-shot circuit 30 is supplied to the AND circuit 31, the output of the AND circuit 31 becomes "High" because the capacitor-OFF signal is "H" at this moment. The output signal of the AND circuit 31 is supplied via the OR circuit 23 to the flip-flop circuit 24, with the result that the flip-flop circuit is set and the gate ignition signal generator 25 is driven. As a result, the gate ignition signal is supplied to the thyristor switch 5 thereby turning on the the the thyristor switch 5.

In the meantime, the switch-ON completion signal derived from the switch 6a is supplied to the time delay circuit TD-3 which will deliver the switch-OFF signal to the switch 2a after a predetermined delay time. At that time, since the thyristor switch 5 has been turned on and the current flowing through the switch 2a is returned to the thyristor switch 5 when the switch 2a is opened, the circuit can be opened without occurrence of arc discharge when the switch 2a is turned off.

When the opening of the switch 2a is accomplished, the switch-OFF completion signal is produced from the switch 2a and supplied to the single-shot circuit 32, and further via the OR circuit 27 to the reset terminal (R) of the flip-flop circuit 24, resetting the flip-flop circuit 24. As a result, the supply of the gate ignition signal from the gate ignition signal generator 25 is interrupted and the thyristor switch 5 is turned off, so that the capacitor 3a is disconnected from the circuit.

As the same sequential operation will be performed when the remaining capacitors 3b and 3c are disconnected from the circuit, a further description is omitted. The current flowing through the capacitors is interrupted by the thyristor switch 5 under the above-described sequential operation, with the result that the switches 2a to 2c can be opened without occurrence of arc discharge.

Figure 11:
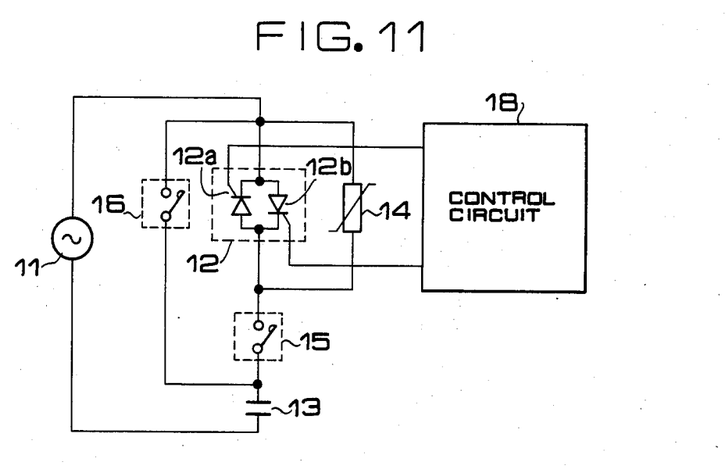
FIG. 11 is a schematic diagram showing the third embodiment of the invention.

In FIG. 11 showing the third embodiment of this invention, the power system includes an a.c. power source 11 having a peak power voltage E, a thyristor switch 12 consisting of two anti-parallel connected thyristors 12a and 12b, and a capacitor load 13, all connected in series in this order. The switchgear further includes a nonlinear resistor 14 connected in parallel to the thyristor switch 12, a mechanical switch 15 used to open the circuit of the thyristor switch, a mechanical switch 16 used to shunt the thyristor switch, and a control circuit 18 for turning on or off the thyristors 12a and 12b.

Figure 12A:
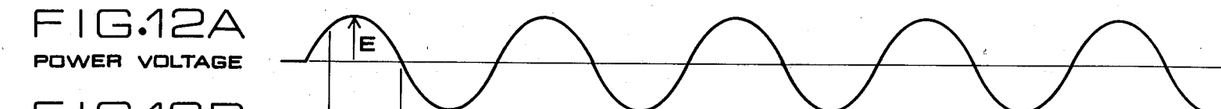
FIGS. 12A-12F are waveform diagrams of the circuit of FIG. 11.
Figure 12B:
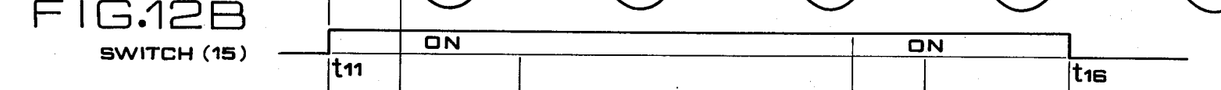
Figure 12C:
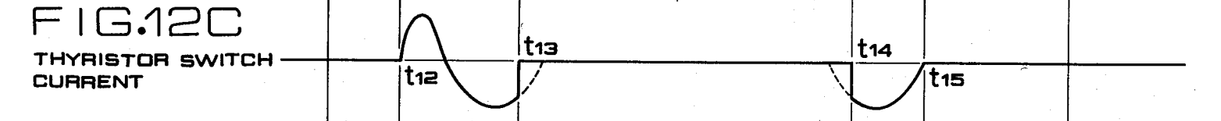
Figures 12D, 12E:
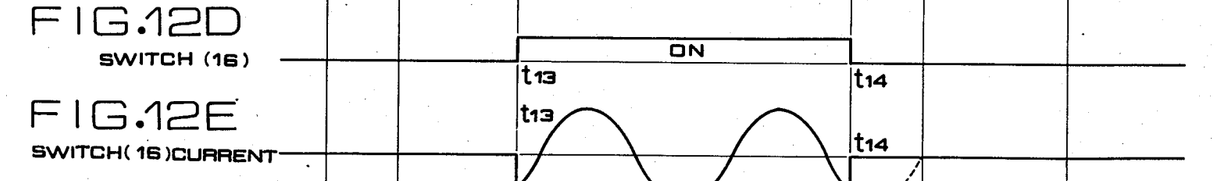
Figure 12F:
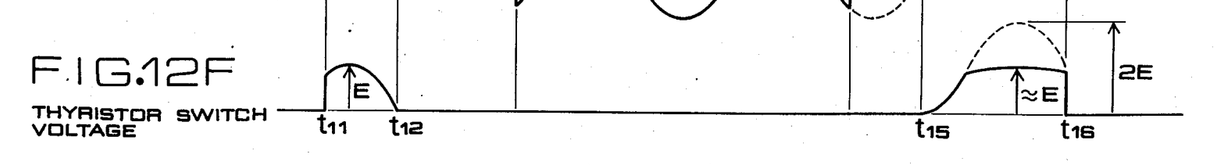

The operation of the foregoing inventive arrangement will be described with reference to the waveforms of FIG. 12A–12F. Initially, the thyristor switch 12 and mechanical switches 15 and 16 are all in the off-state, and the capacitor load 13 is disconnected from the a.c. power source 11. For connecting the capacitor 13 to the a.c. power source 11, the switch 15 is turned on at an arbitrary time point $t_{11}$ as shown in FIG. 12B, while the thyristor switch 12 is kept in the nonconductive state. Consequently, the thyristor switch 12 is applied with a voltage equal to the peak power voltage E as shown in FIG. 12F, and a thyristor switch current flows as shown in FIG. 12C. At a time point $t_{12}$ when the voltage across the thyristor switch 12 has fallen to zero, the control circuit 18 provides a gate signal to the thyristors 12a and 12b so that the thyristor switch 12 is turned on, thereby connecting the capacitor 13 to the a.c. power source 11 without creating a rush current. At a time point $t_{13}$, the switch 16 is turned on as shown in FIG. 12D so as to shunt the thyristor switch 12, and it is turned off. After the same point $t_{13}$, the existing current flows through the switch 16, and almost no electrical loss is created. The switch 15 is left on as shown in FIG. 12B.

For disconnecting the capacitor 13 from the power source 11, the control circuit 18 provides a gate signal so that the thyristor switch 12 is turned on at a time point $t_{14}$ and, at the same time, the switch 16 is turned off. Then, the existing current flows through the switch 15 and thyristor switch 12, creating a thyristor switch current as shown in FIG. 12C. Thereafter, the thyristor gate signal goes off, and the thyristor switch 12 is turned off at a time point $t_{15}$ when the thyristor switch current has fallen to zero. At the time point $t_{15}$, the capacitor 13 is charged to the peak power voltage E, that would cause the application of voltage 2E across the thyristor switch 12 as shown by the dashed curved in FIG. 12F, however the nonlinear resistor 14 connected in parallel to the thyristor switch 12 acts to suppress the voltage to a level substantially equal to the peak power voltage E.

The nonlinear resistor 14 is applied with the voltage only during a short period when the thyristor switch 12 is turned on or off, resulting in a lower power dissipation by the resistor, and accordingly a large voltage factor can be set. The nonlinear resistor 14 also serves to suppress external surge voltages penetrating to the thyristor switch 12 during the application of the power voltage, whereby the thyristor switch 12 suffices to have a withstand voltage as high as the peak power voltage.

After the thyristor switch 12 has turned off, the switch 15 is opened at a time point $t_{16}$, and thereafter the thyristor switch 12 and nonlinear resistor 14 are relieved of the voltage application. The switches 15 and 16 are always operated in a state of zero current as shown in FIG. 12, and therefore they may be circuit breakers with less opening and closing capacities.

Figure 13:
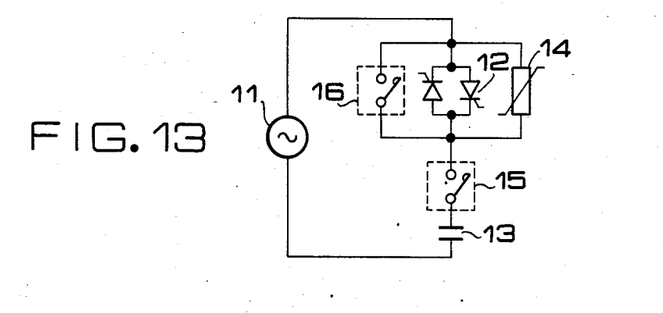
FIG. 13 is a schematic diagram of the fourth embodiment of the invention.

As the fourth embodiment shown in FIG. 13, the mechanical switch 16 for shunting the thyristor switch may be connected directly in parallel to the thyristor switch 12, and the same effect as of the previous embodiment can be achieved. Although in the foregoing embodiments, the switchgear is loaded by a capacitor, the arrangements are applicable to any other load with the achievement of the same effect as described above.

As described above, the inventive switchgear is arranged such that a thyristor switch is connected in parallel with a nonlinear resistor, and further connected in series with a switch for opening the thyristor switch and in parallel with a switch for shunting the thyristor switch, whereby the switchgear using a semiconductor switch with a low withstand voltage, and thus of a low construction cost, and with extremely small power loss during the conductive period can be realized.

Although in the foregoing embodiment the switchgear is used to connect or disconnect capacitor banks, it can be applied to any a.c. load besides capacitor banks. Although the foregoing embodiments employ circuit breakers for the switches, other switching devices can also be used.

Although in the foregoing embodiment the thyristor switch is formed of anti-parallel connected thyristors, other semiconductor switching devices such as GTO thyristors can also be used to accomplish the same effects as described above.

According to the foregoing embodiment, the switchgear is formed such that a common thyristor switch in serial connection with a switch is connected in parallel to a switch for each of the capacitor banks, so that each capacitor bank is connected or disconnected to the a.c. power line in non-contact manner through the thyristor switch, whereby the voltage distortion on the power line when the capacitor bank is connected to the power line is prevented, the work life of the capacitors and switches is not impaired even under continual switching operations, and an inexpensive switchgear with less power loss during the conductive period can be realized. Moreover, the provision of a nonlinear resistor connected in parallel to the thyristor switch is effective for the suppression of an excessive voltage applied to the thyristor switch.

What is claimed is:

1. A switchgear comprising:
   (a) a semiconductor switch connected to an a.c. power source and ON-OFF controlled in synchronism with the phase of said a.c. power source;
   (b) a first switch connected in series with said semiconductor switch between the a.c. power source and the load, and arranged to close in advance of the turn-on operation of said semiconductor switch when said load is to be connected to said a.c. power source and arranged to open after said load has been disconnected from said a.c. power source by the operation of said semiconductor switch when said load is to be disconnected from said a.c. power source; and
   (c) a second switch connected in parallel to at least said semiconductor switch and arranged to close in advance of the turn-off operation of said semiconductor switch when said load is to be connected to said a.c. power source and arranged to open after said semiconductor switch has turned on when said load is to be disconnected from said a.c. power source;
   a nonlinear resistor element connected in parallel to said semiconductor switch;
   means for controlling said semiconductor switch to turn on said semiconductor switch within one cycle of the closing of said first switch when power is to be supplied to said load and to turn off said semiconductor switch approximately one cycle before said first switch is opened when power is to be disconnected from the load whereby the time when voltage is applied to said nonlinear resistor is minimized.

2. A switchgear comprising:
   (a) a semiconductor switch connected to an a.c. power source and ON-OFF controlled in synchronism with the phase of said a.c. power source for controlling a plurality of loads;
   (b) a first plurality of switches each connected in a series circuit with said semiconductor switch between the a.c. power source a corresponding one of said loads, and arranged to close in advance of the turn-on operation of said semiconductor switch when each of said loads is to be connected to said a.c. power source and arranged to open after each of said loads has been disconnected from said a.c. power source by the operation of said semiconductor switch when each of said loads is to be disconnected from said a.c. power source; and
   (c) a second plurality of switches each connected in parallel to a corresponding one of said series circuits and arranged to close in advance of the turn-off operation of said semiconductor switch when each of said loads is to be connected to said a.c. power source and arranged to open after said semiconductor switch has turned on when each of said loads is to be disconnected from said a.c. power source.

3. A switchgear as claimed in claim 2, wherein a nonlinear resistor element is connected in parallel to said semiconductor switch.

* * * * *

UNITED STATES PATENT AND TRADEMARK OFFICE
CERTIFICATE OF CORRECTION

PATENT NO. : 4,695,741

DATED : September 22, 1987

INVENTOR(S) : Masatoshi Takeda

It is certified that error appears in the above-identified patent and that said Letters Patent is hereby corrected as shown below:

Column 1, line 40, "tyristor" should be --thyristor--.

Column 2, line 15, "rates" should be --rated--;

line 66, "poiint" should be --point--.

Signed and Sealed this

Second Day of February, 1988

*Attest:*

DONALD J. QUIGG

*Attesting Officer*      *Commissioner of Patents and Trademarks*